US012673370B2

(12) United States Patent

Troksa et al.

(10) Patent No.:     US 12,673,370 B2

(45) Date of Patent:          Jul. 7, 2026

(54) ELECTROSTATIC POWDER REMOVER FOR POWDER BED FUSION ADDITIVE MANUFACTURING

(71) Applicant: Lawrence Livermore National Security, LLC, Livermore, CA (US)

(72) Inventors: Michael John Troksa, Veradale, WA (US); Ziheng Wu, Seattle, WA (US); Eric S. Elton, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 477 days.

(21) Appl. No.: 18/162,086

(22) Filed: Jan. 31, 2023

(65) Prior Publication Data

US 2024/0253125 A1     Aug. 1, 2024

(51) Int. Cl.
| | |
|---|---|
| *B22F 10/68* | (2021.01) |
| *B22F 12/60* | (2021.01) |
| *B33Y 30/00* | (2015.01) |
| *B33Y 40/20* | (2020.01) |
| *B22F 10/28* | (2021.01) |

(52) U.S. Cl.
CPC ............. *B22F 10/68* (2021.01); *B22F 12/60* (2021.01); *B33Y 30/00* (2014.12); *B33Y 40/20* (2020.01); *B22F 10/28* (2021.01)

(58) Field of Classification Search
None
See application file for complete search history.

(56) References Cited

U.S. PATENT DOCUMENTS 4,056,368 A      11/1977  Rozmus
4,922,099 A  *   5/1990   Masuda ................. B05B 5/043
                                                            361/230

(Continued)

FOREIGN PATENT DOCUMENTS

EP            3838444 A1     6/2021
JP         2019157235 A      9/2019

OTHER PUBLICATIONS

International Searching Authority, International Search Report and Written Opinion, PCT International Application No. PCT/US2024/011382, mailed May 11, 2024, 12 pages.

(Continued)

*Primary Examiner* — Seth Dumbris

(74) *Attorney, Agent, or Firm* — HARNESS DICKEY & PIERCE PLC

(57)          ABSTRACT

The present disclosure relates to a system for removing an upper layer of powder from a powder bed, wherein the powder bed includes metal powder particles. The system makes use of an electrode subsystem having an electrode and a dielectric layer secured to the electrode. A metallic build plate is used for supporting the powder layer thereon. The electrode subsystem is supported above an upper surface of the powder bed such that the dielectric layer is separated from the upper surface by a gap of a predetermined distance. A power source is coupled to the electrode subsystem and the build plate for supplying a voltage across the electrode subsystem and the build plate. The voltage generates an electric field in the gap which is sufficient to attract and lift a predetermined thickness portion of the powder layer adjacent the upper surface, onto the dielectric layer, to leave a new upper surface on the powder bed.

20 Claims, 8 Drawing Sheets

(56)                 References Cited

U.S. PATENT DOCUMENTS

| | | | |
|---|---|---|---|
| 2010/0292757 A1 | 11/2010 | Ehlbeck et al. | |
| 2011/0190904 A1* | 8/2011 | Lechmann | A61F 2/3094 |
| | | | 623/23.61 |
| 2015/0367448 A1* | 12/2015 | Buller | H05B 6/68 |
| | | | 219/74 |
| 2016/0368055 A1* | 12/2016 | Swaminathan | B23K 26/16 |
| 2018/0141126 A1* | 5/2018 | Buller | B29C 64/153 |
| 2021/0060650 A1* | 3/2021 | Anthony | B33Y 30/00 |
| 2022/0029718 A1 | 1/2022 | Ramian et al. | |

OTHER PUBLICATIONS

Ouseph, P. J. and Davis, C. L. (2001). Walking a charged pith ball perpendicular to an electric field. American Journal of Physics, 69(1), 88-90.

Wei, Chao and Li, Lin. (2021). Recent progress and scientific challenges in multi-material additive manufacturing via laser-based powder bed fusion. Virtual and Physical Prototyping, 16:3, 347-371, doi: 10.1080/17452759.2021.1928520.

Zhang, Xiaoji, Wei, Chao, Chueh, Yuan-Hui and Li, Lin. (2019). An Integrated Dual Ultrasonic Selective Powder Dispensing Platform for Three-Dimensional Printing of Multiple Material Metal/Glass Objects in Selective Laser Melting. Journal of Manufacturing Science and Engineering, Transactions of ASME 141 (1): 1-12. doi:10.1115/1.

Scaramuccia, Marco Giuseppe, Demir, Ali Gökhan, Caprio, Leonardo, Tassa, Oriana and Previtali, Barbara. (2020). Development of Processing Strategies for Multigraded Selective Laser Melting of Ti6A14V and IN718. Powder Technology 367: 376-389. doi 10.1016/j.powtec.2020.04.010.

Glasschroeder, J., Prager, E., and Zaeh, M. F. (2015). Powder-Bed-Based 3D-Printing of Function Integrated Parts. Rapid Prototyping Journal 21 (2): 775-792.4041427.

Foerster, J., Michatz, M., Binder, M., Frey, A., Seidel, C., Schlick G., and Schilp, J. (2022). Electrostatic powder attraction for the development of a novel recoating system for metal powder bed-based additive manufacturing. Journal of Electrostatics, 115, 10641. doi:10.1016/j.elstat.2021.103641 Aerosint. (Jun. 15, 2022). Retrieved Sep. 9, 2022, from https://aerosint.com/.

Novick, Vincent J., Hummer, Charles R., and Dunn, Patrick F. (1989). Minimum de electric field requirements for removing powder layers from a conductive surface. Journal of Applied Physics. 65, 3242-3247. https://doi.org/10.1063/1342677.

\* cited by examiner

- An Electric Field With Strength of 0.3 - 0.4 x 10⁷ V/m Developed at the Polycarbonate Dielectric Layer When 10 kV is Applied to the Counter Electrode

- The Dielectric Breakdown Field Strength for Polycarbonate is 1.5 - 3.4 x 10⁷ V/m

| Test # | Gap Size (mm) | Voltage (kV) | Stage Velocity (mm/s) | Distance (mm) | Duration (s) | Note |
|---|---|---|---|---|---|---|
| 1 | 18 | 10 | 10 | 0-300 | – | Along Spreading Direction |
| 2 | 18 | 10 | 20 | 0-300 | – | Along Spreading Direction |
| 3 | 18 | 10 | 10 | 0-300 | – | Against Spreading Direction |

(Test 1)

(Test 2)

(Test 3)

• Powder Height Gradient Exists Along the Scanning Direction
• The Leading Edge of the Powder Bed Always Experience a "Distorted" Electric Field Effects of Solid Part in Powder Bed

- The Powder Lift Can Remove Around 150 μm Thick Powder Layer in Dynamic Mode
- The Electric Field was Significantly Distorted by the "Part", i.e., Center Island; thus the Powder Removal at its Surrounding was Affected.

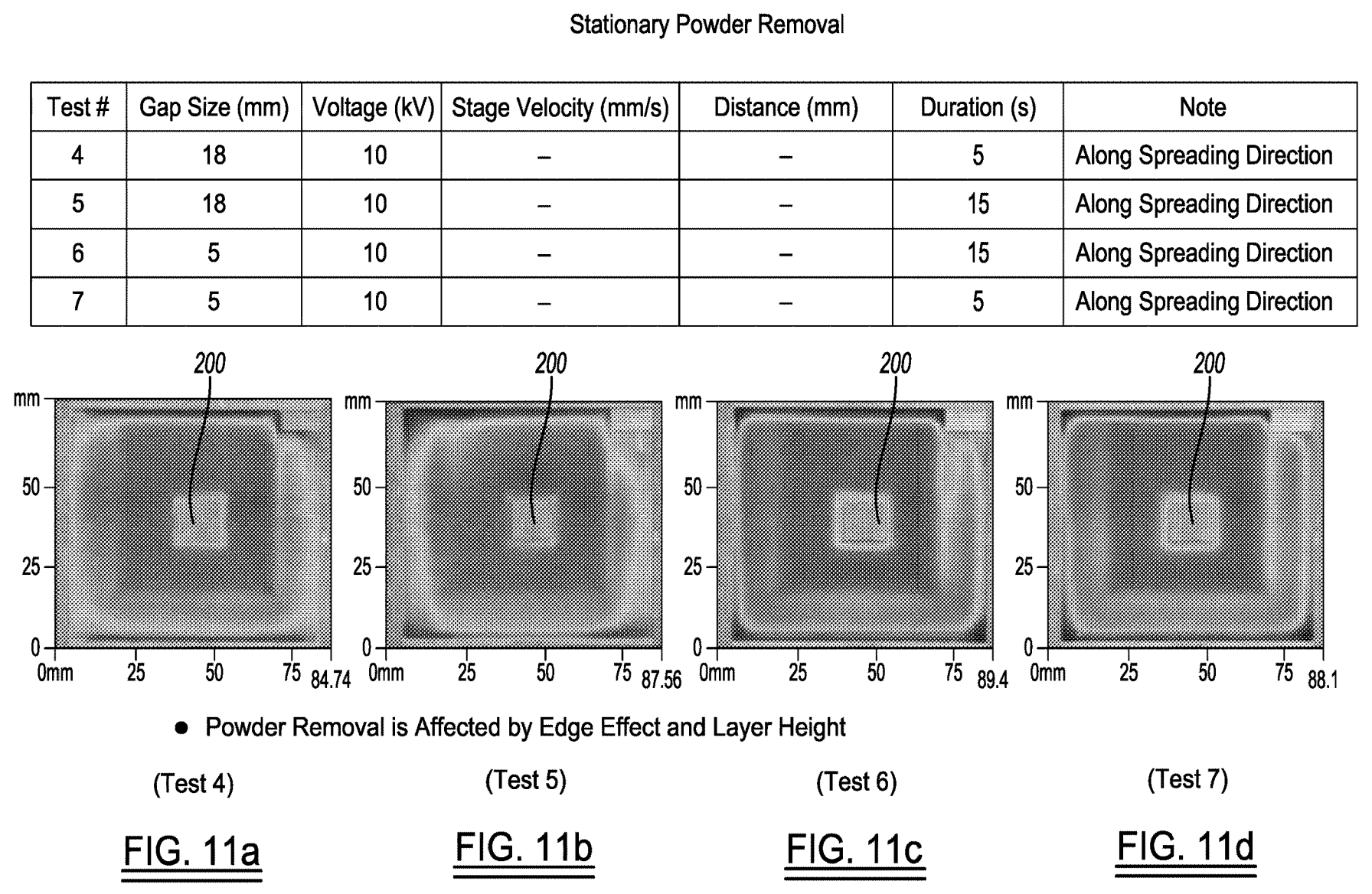

Stationary Powder Removal

| Test # | Gap Size (mm) | Voltage (kV) | Stage Velocity (mm/s) | Distance (mm) | Duration (s) | Note |
|--------|---------------|--------------|------------------------|---------------|--------------|------|
| 4 | 18 | 10 | – | – | 5 | Along Spreading Direction |
| 5 | 18 | 10 | – | – | 15 | Along Spreading Direction |
| 6 | 5 | 10 | – | – | 15 | Along Spreading Direction |
| 7 | 5 | 10 | – | – | 5 | Along Spreading Direction |

(Test 4)

FIG. 11a (Test 5)

FIG. 11b (Test 6)

FIG. 11c (Test 7)

FIG. 11d

- Powder Removal is Affected by Edge Effect and Layer Height

ELECTROSTATIC POWDER REMOVER FOR POWDER BED FUSION ADDITIVE MANUFACTURING

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to additive manufacturing systems and methods, and more specifically to a non-contact, powder bed debris removal and levelling system well suited for use with powder bed additive manufacturing systems.

BACKGROUND

The statements in this section merely provide background information related to the present disclosure and may not constitute prior art.

In additive manufacturing (AM) processes, powder bed anomalies can be detrimental to the quality of the powder bed fusion printed components. Powder bed anomalies are also one of the primary causes of part build failure, which can significantly increase production costs using an AM process.

Powder bed anomalies are often the result of uneven spreading of powder particles onto a build table when carrying out a powder bed AM process. This is especially so when multiple different types of powder particles are used in forming the powder bed. For a multi-material powder bed, the conventional contact spreading methods are not feasible since the spreading operation will distort the material pattern on a powder bed. All the existing and developing multi-materials spreader techniques are noncontact-based technologies. These noncontact-based spreading techniques are not capable of correcting the powder bed if any anomalies present.

The fundamental physics of how a powder bed can be modified through the use of a controlled electric field has been extensively studied. For example, Novick et al. showed that the metal powder particles can be moved by a controlled electric field (Novick et al., Journal of Applied Physics 65, 3242 (1989); see also Ouseph, P. J., & Davis, C. L., Walking a charged pith ball perpendicular to an electric field (2001); American Journal of Physics, 69(1), 88-90; Novick, V. J., Hummer, C. R., & Dunn, P. F., Minimum dc electric field requirements for removing powder layers from a conductive surface. Journal of applied physics, 65(8), 3242-3247 (1989). The following articles show the state-of-art multi-materials spreading technologies for powder bed additive manufacturing. These technologies highlight the recent evolvements of multi-materials powder bed processes and emphasize the need of a powder remover to mitigate powder anomalies: Chao Wei & Lin Li (2021) Recent progress and scientific challenges in multi-material additive manufacturing via laser-based powder bed fusion, Virtual and Physical Prototyping, 16:3, 347-371, DOI: 10.1080/17452759.2021.1928520; Zhang, Xiaoji, Chao Wei, Yuan Hui Chueh, and Lin Li. 2019, An Integrated Dual Ultrasonic Selective Powder Dispensing Platform for Three-Dimensional Printing of Multiple Material Metal/Glass Objects in Selective Laser Melting, Journal of Manufacturing Science and Engineering, Transactions of the ASME 141 (1): 1-12. doi:10.1115/1; Scaramuccia, Marco Giuseppe, Ali Gökhan Demir, Leonardo Caprio, Oriana Tassa, and Barbara Previtali. 2020. Development of Processing Strategies for Multigraded Selective Laser Melting of Ti6Al4 V and IN718. Powder Technology 367: 376-389. doi:10.1016/j.powtec.2020.04.010. Glasschroeder, J., E. Prager, and M. F. Zaeh. 2015. Powder-Bed-Based 3D-Printing of Function Integrated Parts, Rapid Prototyping Journal 21 (2): 775-792.4041427. Foerster, J., Michatz, M., Binder, M., Frey, A., Seidel, C., Schlick, G., & Schilt, J. (2022). Electrostatic powder attraction for the development of a novel recoating system for metal powder bed-based additive manufacturing. Journal of Electrostatics, 115, 103641. doi:10.1016fj.elstat.2021.103641; Arsonist. (2022, June 15). Retrieved Sep. 9, 2022, from https://aerosint.com. All of the foregoing materials are hereby incorporated by reference into the present disclosure.

Powder bed AM systems have rapidly evolved in the past decade. Such systems operate in a layer-by-layer manner, meaning one is able to build complex geometries, while providing still further advantages in part design and construction, that are unmatched by other conventional manufacturing techniques. The series of operations performed by these powder bed AM systems can be summarized as including two major operations: 1) feedstock delivery, and 2) consolidation. The consolidation step is usually completed by a heat source, e.g., laser, or a binder jet. On the other hand, the feedstock delivery step is usually completed by a re-coater in a form of a blade/rake/roller, each of which forms a contact-based powder bed spreading technique. The results of the feedstock delivery step directly affect the quality of the as-built components.

In the past few years there has been growing interest in developing a "multi-materials" printing capability for AM processes. By "multi-materials" it is meant printing a given layer, or layers, of an AM formed part using two or more different types of powder feedstock materials. This is because many applications (and types of parts) can benefit from leveraging the advantages of additive manufacturing and the properties provided by multiple different types of feedstock materials. For example, some heat exchangers can utilize a copper core for better thermal conductivity and a stainless steel shell for better high-temperature strength. Due to the configurations of previously existing powder bed AM processes, the implementation of multi-materials powder delivery has been a significant challenge. Several multi-materials powder delivery systems have been developed, including at least one recently commercialized system. However, all of these recently developed multi-material powder delivery systems, which are all noncontact-based techniques, still are unable to correct any powder bed anomalies if present.

Accordingly, there remains an important and immediate need for a noncontact-based powder removal technology which significantly reduces the possibility of damaging the powder bed, and more particularly for a system and method which reduces the possibility of damage to the powder bed caused by inadvertently dragging debris generated during the printing process as powder spreading is carried out.

SUMMARY

This section provides a general summary of the disclosure, and is not a comprehensive disclosure of its full scope or all of its features.

In one aspect the present disclosure relates to a system for removing an upper layer of powder from a powder bed, wherein the powder bed includes metal powder particles. The system may comprise an electrode subsystem having an electrode and a dielectric layer secured to the electrode. A metallic build plate may be included for supporting the powder bed thereon. The electrode subsystem may be supported above the powder bed such that the dielectric layer is separated from an upper surface of the powder bed by a gap of a predetermined distance. A power source may be included which is coupled to the electrode subsystem and the build plate for supplying a voltage across the electrode subsystem and the build plate. The voltage generates an electric field in the gap which is sufficient to attract and lift a predetermined thickness portion of the powder bed adjacent the upper layer, onto the dielectric layer, to leave a new upper surface on the powder bed.

In another aspect the present disclosure relates to a system for removing an upper layer of powder from a powder bed, where the powder bed is being used in a laser powder bed fusion (LPBF) additive manufacturing (AM) operation. The system may comprise an electrode subsystem having a planar electrode and a planar dielectric layer secured to the planar electrode. An electrically conductive build plate is included for supporting the powder bed thereon. The electrode subsystem may be supported above the powder bed such that the dielectric layer is separated from the upper surface of the powder bed by a gap of a predetermined, uniform distance. A DC power source may be coupled to the electrode subsystem and the build plate for supplying a DC voltage across the electrode subsystem and the build plate. The voltage generates an electric field in the gap which is sufficient to attract and lift a predetermined thickness portion of the powder bed adjacent the upper surface, onto the dielectric layer, to leave a new upper surface on the powder bed.

In still another aspect the present disclosure relates to a method for removing an upper surface layer of powder from a powder bed, wherein the powder bed includes metal powder particles. The method may comprise using a metallic build plate to support the powder bed thereon. The method may further include arranging an electrode subsystem having an electrode and a dielectric layer secured to the electrode above an upper surface of the powder bed, wherein the electrode subsystem is separated from the upper surface layer of the powder bed by a gap having a predetermined distance. The method further includes applying an electrical signal across the electrode subsystem and the metallic build plate to generate an electric field in the gap, and using the electric field to lift a portion of the powder bed adjacent the upper surface layer of the powder bed, onto the dielectric layer, to create a new surface layer for the powder bed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIGS. 10a, 10a1, 10a2, 10b, 10b1, 10b2, 10c, 10c1 and 10c2 show tests results illustrating the effect of powder lift and the variation in electric field strength when scanning the electrode subsystem at different velocities; and wherein the test results were measured from the area around the solid block 200 where the powder removal was not significantly impacted by the "edge effect" caused by the outer edges of the copper block; and FIGS. 11a-11d show graphs further illustrating how the electric field strength and the amount of powder lift achieved is affected by the distortion in the electric field at the edge of the electrode subsystem; and it will be noted that the tests were conducted using a stationary powder remover similar to the design shown in FIGS. 2 and 3 of which the top electrode is larger than the area of the powder bed; and wherein the consistent powder removal in all tests with various durations and gap sizes implies that the electrode subsystem was saturated in every single test.

DETAILED DESCRIPTION

Example embodiments will now be described more fully with reference to the accompanying drawings.

The present disclosure relates to non-contact systems and methods for removing a controlled layer of powder feedstock material from a powder bed, using a controlled electric field, in a powder bed fusion additive manufacturing (PBFAM) process. A plurality of different embodiments described herein involve the use of different electrode designs which can be adapted to different additive manufacturing (AM) systems. The various embodiment described herein are able to be readily mounted to a re-coater housing of a powder bed process and require minimum modifications to the machine.

Figure 1:
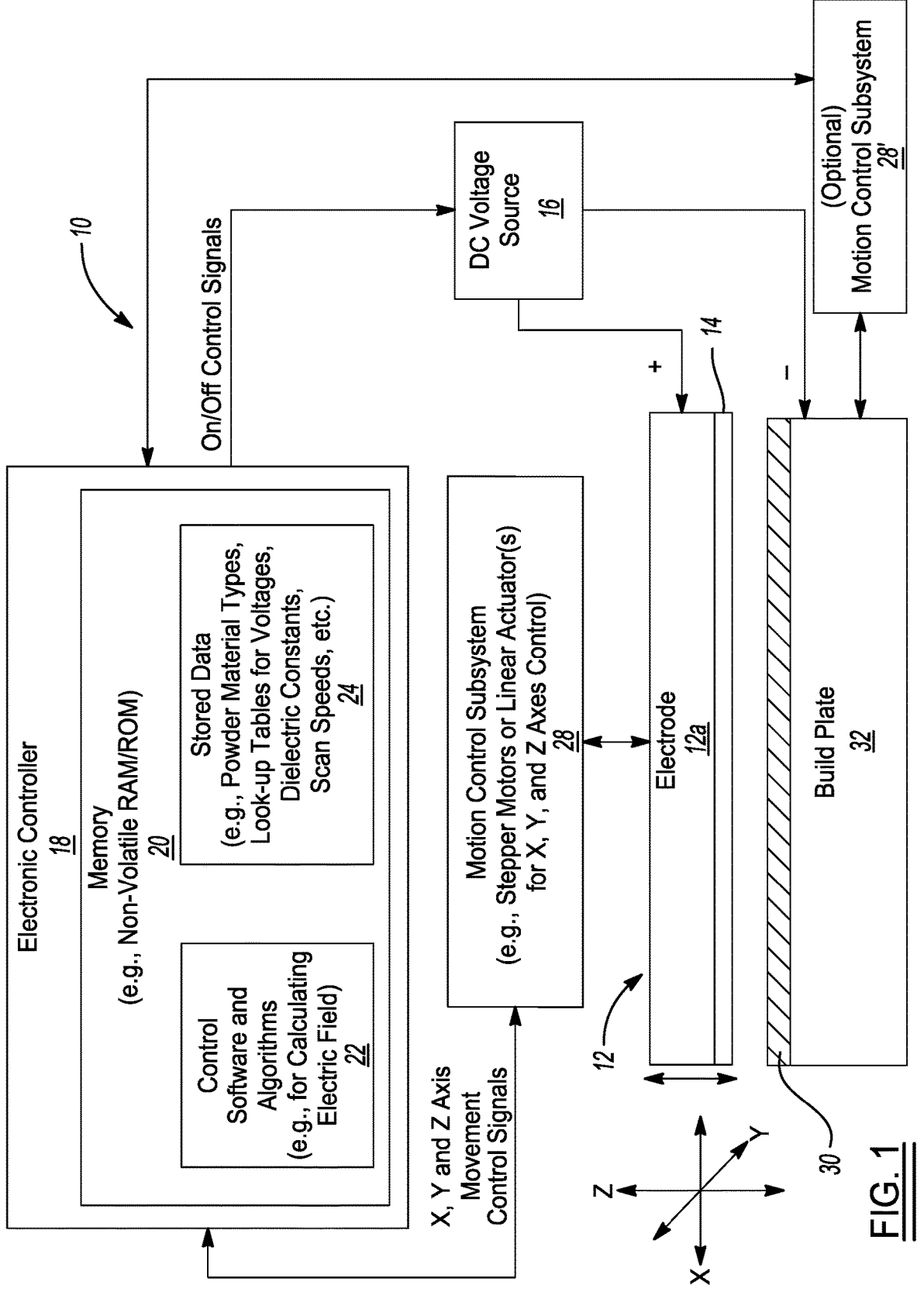
FIG. 1 is a high level block diagram of one embodiment of a system in accordance with the present disclosure which makes use of a full-size electrode subsystem, sufficient in area to cover a surface of a powder layer.

Referring now to FIG. 1, one embodiment of a system 10 is shown in accordance with the present disclosure. The system 10 in this embodiment incorporates an electrode subsystem 12 having a surface area sufficient to cover the entire area of a powder layer 30 being supported on a build plate 32. The electrode subsystem 12 includes a planar electrode 12a and a planar dielectric layer 14, which in this example covers an entire lower surface area of the electrode 12a. The electrode subsystem is electrically energized using a DC voltage source 16, wherein one of a positive or negative connection is made to the one of the electrode or the build plate 32, and a ground connection is made to the other one of the electrode 12a or build plate 32. In this example the positive connection is made to the electrode 12a and the ground connection is made to the build plate 32, but both configurations will serve to apply a potential between the electrode 12a and the powder layer 32. This is because the powder layer 30 incorporates metal powder feedstock. Thus, the powder feedstock material forms a conductive path between the build plate 32 and the powder layer 30.

On and Off operation of the DC voltage source 16 may be controlled by an electronic controller 18 (e.g., microcomputer, micro-processor based control system, laptop, FPGA, desktop or any other suitable form of computing device). The electronic controller 18 includes, or may be in communication with, a memory 20. The memory 20 may be, for example, a non-volatile RAM, ROM or any other suitable form of memory for storing programs, algorithms, data, etc.). The memory 20 in this example includes control software 22 and one or more stored data files 24. The control software may be software designed for controlling ON/OFF operation of the DC voltage source 16, as well as controlling motion of the electrode subsystem 12 and/or the build plate 32 as a part is built up, layer-by-layer, using the powder layer 30 during a PBFAM build process. The control software 32 may also include one or more algorithms for calculating electric field strengths, calculating dwell times that the electrode subsystem 12 is to be energized, calculating scanning speeds for the electrode subsystem (assuming a movable electrode subsystem is being employed), and other variables needing to be considered when using different types of powder feedstock materials. The one or more stored data files 24 may include one or more look-up tables and/or data or constants relating electric field strengths, scan speeds, dwell times, electrode-to-powder layer spacing distances, and other variables for a variety of different types of powder feedstock materials, and any other data or variables needed for carrying out and/or optimizing operation of the system 10.

The system 10 may also include a motion control subsystem 28 for moving the electrode subsystem 12 along X, Y and Z axes. In the example of FIG. 1, however, the electrode subsystem has an X/Y area which is sufficient to completely cover the entire surface area of the powder layer 30, so no movement within the X/Y plane is needed, and the electrode subsystem 12 remains stationary while energized and acting on an upper surface portion of the powder layer 28. Accordingly, in the embodiment shown in FIG. 1, the electrode subsystem 12 only requires movement along the Z axis to move it to a position of needed, predetermined spacing (i.e., gap) from the upper surface of the powder layer 30, and then away from the upper surface of the powder layer to allow a new powder layer to applied on top of the just-fused powder layer. The motion control subsystem 38 may be formed using one or more DC stepper motors, one or more linear actuators, or one or more other suitable components, to enable precise incremental movement along at least the Z axis, and optionally along the X and Y axes, depending on the specific type of electrode subsystem 12 being used.

FIG. 1 also shows an optional motion control subsystem 28' that may be used to move the build plate along one or more of the X, Y and/or Z axes. The optional motion control subsystem 28' may similarly include one or more stepper motors, one or more linear actuators or other form(s) of components needed for precise incremental movement, like the motion control subsystem 28. It is expected that one or the other of the motion control subsystems 28 or 28' will be used, but most typically not both. However, it is possible to use both of the subsystems 28 and 28', for example one to control relative motion in the X/Y plane between the electrode subsystem 12 and the build plate 32, and the other to control only Z axis relative motion between the electrode subsystem 12 and the build plate 32. If incorporated, the optional motional control subsystem 28' may be controlled with suitable control signals from the electronic controller 18, or optionally may include its own electronic controller (not shown) which communicates with the electronic controller 18.

With further reference to FIG. 1, the electrode 12a of the electrode subsystem 12 may be formed by a suitable electrically conductive material, in some embodiments by at least one of: gold; silver; copper; steel; aluminum; and iron, and in some embodiments more preferably by stainless steel. The cross-sectional thickness may vary significantly to meet the specific needs of a particular application, but in some embodiments the electrode 12a thickness is between about 5 mm-10 mm, and in some embodiments more preferably between 5 mm-8 mm. The dielectric layer 14 may also vary in construction as needed to meet a specific application, and in some embodiments is constructed of polypropylene or polycarbonate and may have a thickness ranging from about 1 mm to several mm, and in some embodiments ranges more preferably between about 1 mm to about 5 mm. The dielectric layer 14 may be fixedly secured to a lower surface of the electrode 12a via any suitable means, and in some embodiments may be secured via one or more adhesives which provide a strong bond therebetween.

Figure 2:
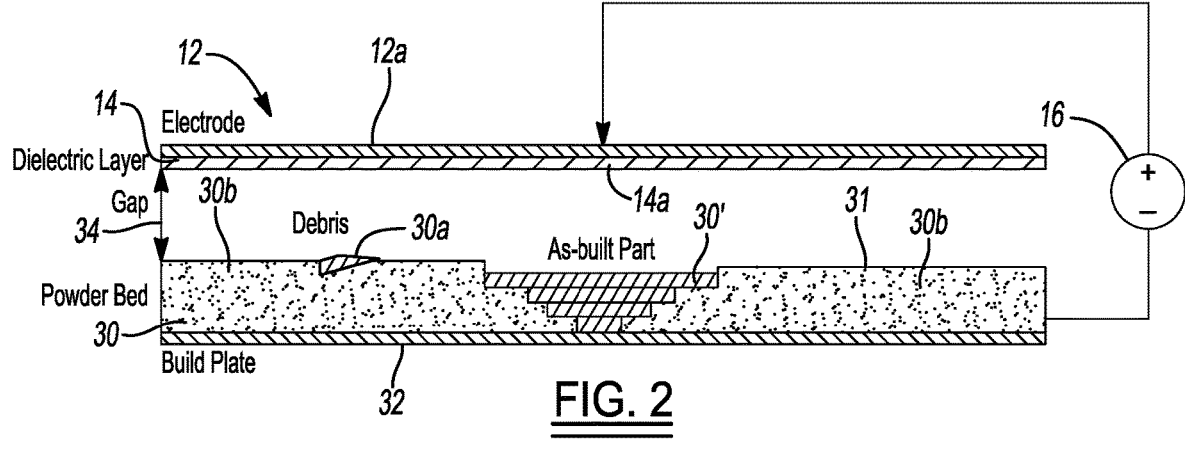
FIG. 2 is a high level diagrammatic side view of the electrode subsystem and its associated dielectric layer of the system of FIG. 1 in position to begin removing an upper surface portion of a powder bed layer, as well as debris, after fusing of a selected portion of the powder bed layer has occurred.
Figure 3:
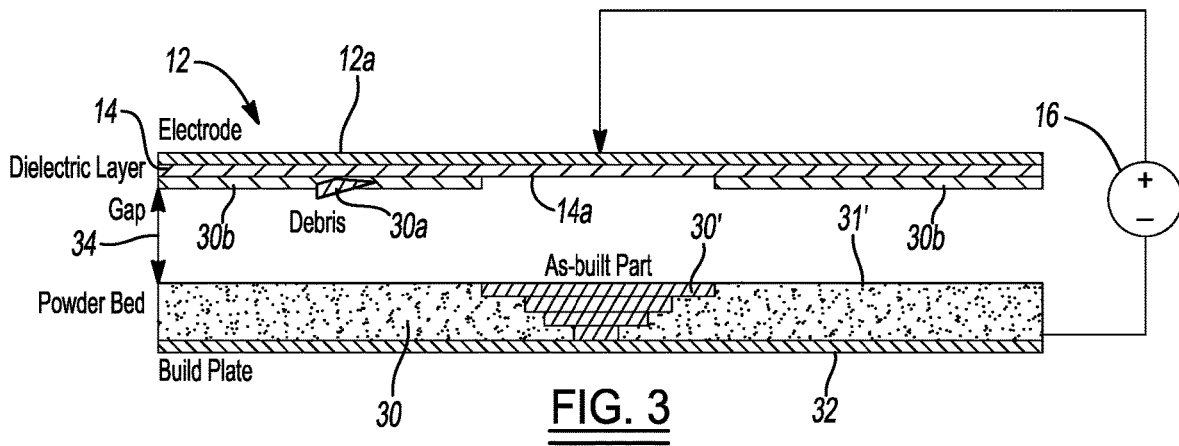
FIG. 3 shows the electrode subsystem of FIG. 2 after having picked up an excess upper surface portion of the powder layer and a piece of debris, with the excess surface portion and the debris attached to the dielectric layer.

Referring now to FIGS. 2 and 3, operation of the system using the electrode subsystem 12 will be described. The electrode 12a is initially positioned such that a lower surface 14a of the dielectric layer 14 is spaced apart from an upper surface 31 of the powder bed 30 by a predetermined gap 34. The predetermined gap 34 may vary in distance depending on a plurality of variables, for example the potential difference applied by the voltage source 16, the material used for the dielectric layer 14, the material used for the electrode 12*a*, and the specific materials used as the powder feedstock for the powder bed 30. Typically, however, the gap 34 will be broadly within the range of about a few mm to about 20 mm, and in some embodiments within an even narrower range of about 5 mm-10 mm, and in some embodiments about 5 mm, and in some embodiments between 1 mm and 0.5 mm. The voltage applied by the DC voltage source 16 to create the needed electric field may likewise vary considerably, but in some embodiments is broadly between about 5 kV and 20 kV, and in some embodiments is more narrowly between about 6 kV and 8, and in one specific embodiment is about 7 kV. The specific voltage required will vary on a number of factors including the gap 34 dimension, as well as possibly the type of powder material being used to form the powder bed, the thickness of the dielectric layer 14, the operating atmosphere, and possibly the scanning speed, if an electrode subsystem is being used which is being moved over the powder bed 30 rather than stationary. The dwell time that the electrode subsystem 12 is energized for may vary considerably, but in some embodiments is broadly between about 1-10 seconds, and in some embodiments more narrowly between about 1-3 seconds.

In FIG. 2, one or more layers of a part 30' under construction have been formed (i.e., fused) in previous fusing operations. As such, the part 30' forms a solid structure at this point during the PBFAM process. Due to shrinkage, however, an upper surface of the part 30' rests slightly below the upper surface 31 of the remainder of the powder bed layer 30. Also, a piece of debris 30*a* has become present in the powder bed 30 at this point during the PBFAM process. Both the shrinkage and the debris 30*a* will negatively affect the overall quality and precision of the part 30' as the PBFAM build process continues with one or more subsequently applied powder feedstock layers being laid on top of the upper surface 31 of the powder bed 30 unless these issues are addressed. And in many instances, these types of build quality issues (i.e., debris and/or shrinkage) will be magnified with each successive layer that is fused to form the part 30'. Accordingly, it is desirable to address these issues as soon as they arise when a given layer is fused during the BPFAM process.

The system 10 addresses the above quality issues by electrically energizing the electrode system 12, which enables an electric field to be generated between the powder bed 30 and the dielectric layer 14. The electric field has sufficient strength to cause an upper surface portion 30*b* of the powder bed 30 to be lifted up to and attach to the dielectric layer 14, when a specific needed dwell time is used for maintaining the electrode 12*a* energized. The thickness of the removed layer 30' may vary considerably depending on one or more of the construction of the electrode subsystem 12 and its components, the gap 34 distance, the strength of the electric field being applied, the specific dwell time during which the electrode subsystem 12 is energized, the specific composition of the powder feedstock material making up the powder bed 30, and possibly other variables as well.

FIG. 3 shows powder bed 30 and the electrode subsystem 12 after the debris removal and re-levelling of the upper surface of the powder bed 30 has been achieved by the system 10. Upper surface portion 30*b* of the powder bed 30 has been removed from the powder bed 30, as has the debris 30*a*. The electric field used to remove the debris 30*a* and the surface portion 30*b* of the powder bed 30 leaves a newly levelled upper surface 31' on the powder bed 30. Thus, when a new layer of powder feedstock material is deposited onto the new upper surface 31', the upper surface of the new powder feedstock material will be uniform and level, or at least substantially level. Thus, any surface irregularities that were previously present after fusing the prior formed layer will not be carried out and/or magnified with each successive powder layer fused as the part 30' is constructed during the layer-by-layer PBFAM build process.

Another advantage of the electrode subsystem 12 is that even after debris 30*a* and the surface portion 30*b* of powder is removed and attached to the dielectric layer 14, turning off the electric field and de-energizing the electrode subsystem 12 will not cause the debris 30*a* and the surface portion 30*b* to be released from the dielectric layer as the electrode subsystem 12 and/or the build plate 32 are moved away from one another. Thus, there is no risk of re-depositing any debris or just-removed powder material back onto the upper surface 31' of the powder layer 30. There remains an attractive force between the dielectric layer 14 and the just-removed debris 30*a* and powder material surface portion 30*b*, which maintains these material portions adhered to the dielectric layer 14, because the non-conductive dielectric layer prevents the charge exchange between the powder particles 30*b* and the electrode 12. A subsequent action to manually remove the just-removed debris 30*a* and the powder material surface portion 30*b* with a suitable tool, such as a brush or possibly scraper-like device, may then be carried out before the electrode subsystem 12 is repositioned closely adjacent the upper surface of a newly applied powder layer in accordance with the predetermined gap 34.

As noted above, the determination of the electric field strength needed to remove the upper surface portion 30*b* and the debris 30*a* is an operation that will need to be carried out when the system 10 is initially set up for operation, as well as when selecting, or changing, a specific powder feedstock material being used during the PBFAM process. The strength of the electric field needs to be sufficient to overcome gravity and lift the surface portion 30*b* of the powder bed, as well as the debris 30*a*, without causing a breakdown of the dielectric layer 14. One tool that is helpful for calculating the needed electric field is COMSOL Multiphysics® simulation software. This software is commercially available from COMSOL, Inc. of Burlington, MA, and may be stored in the memory 20 for use by the system 10 when licensed for use.

Figure 4:
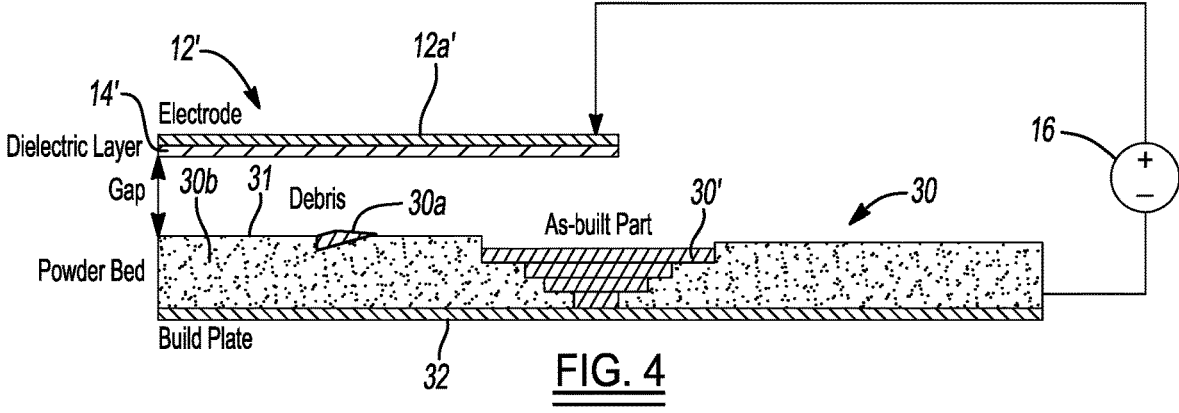
FIG. 4 is a high level side diagrammatic view of another embodiment of the electrode subsystem which has length and width dimensions sufficient to only cover a portion of the powder bed, and which may be moved along X and/or Y axes while energized.
Figure 5:
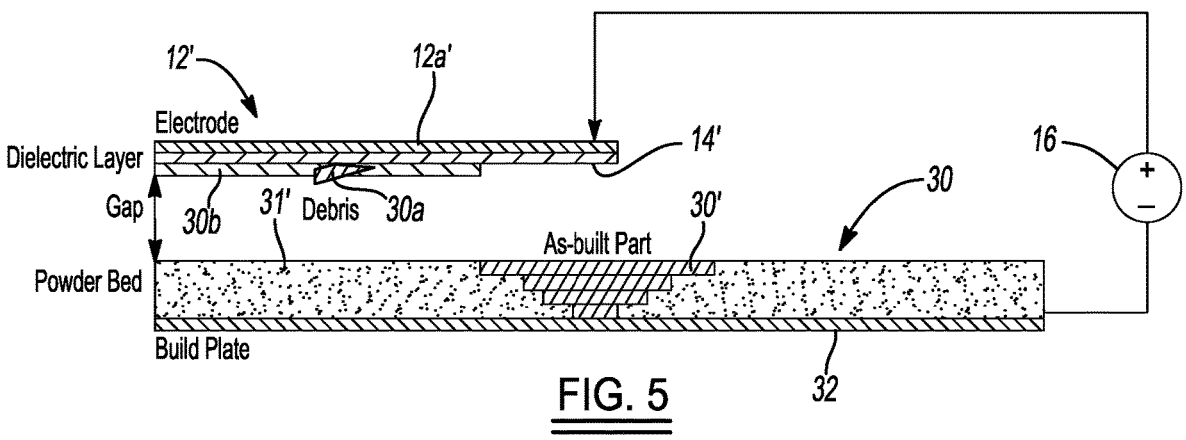
FIG. 5 shows the electrode subsystem of FIG. 4 after having picked up a predetermined, excess upper surface portion of the powder bed layer along with debris that was present on the upper surface portion of the powder bed layer.

Referring now to FIGS. 4 and 5, another embodiment of the electrode subsystem 12 is shown and designated with the reference number 12'. Electrode subsystem 12' may be used with the other components of the system 10 as described in FIG. 1. The electrode subsystem 12' in this embodiment has an area which is not sufficient to cover an entire surface area of the build plate 32 or the powder layer 30, and as such the electrode subsystem 12' requires movement in the X/Y plane over the powder bed. As such, at least one of the movement subsystems 28 or 28' described in FIG. 1 may be used to move the electrode subsystem 12' as needed to overlay areas where removal of debris 30*a* and/or the surface portion 30*b* of the powder bed 30 is required. Operation of the electrode subsystem 12' is otherwise the same as that described for the electrode subsystem 12 in FIGS. 2 and 3, however, since the electrode subsystem 12' is being scanned in the X/Y plane, the scanning speed will be a variable that needs to be taken into account when determining the needed electric field to remove a desired thickness of the upper surface portion of the powder bed 30. Scanning may be done in any sequence, and the scan pattern may be dictated at least in part by the overall area of the electrode subsystem 12' relative to the surface area of the powder layer 30. Thus, a single linear scan motion along one of the X or Y axes may suffice to traverse over the entire upper surface area of the powder bed 30, or a plurality of back-and-forth scanning movements, for example in a raster pattern, may be needed to cover the entire surface area of the powder layer 30 if the width and length of the electrode subsystem 12' are both less than the width and length of the surface area of the powder bed 30.

Figure 6:
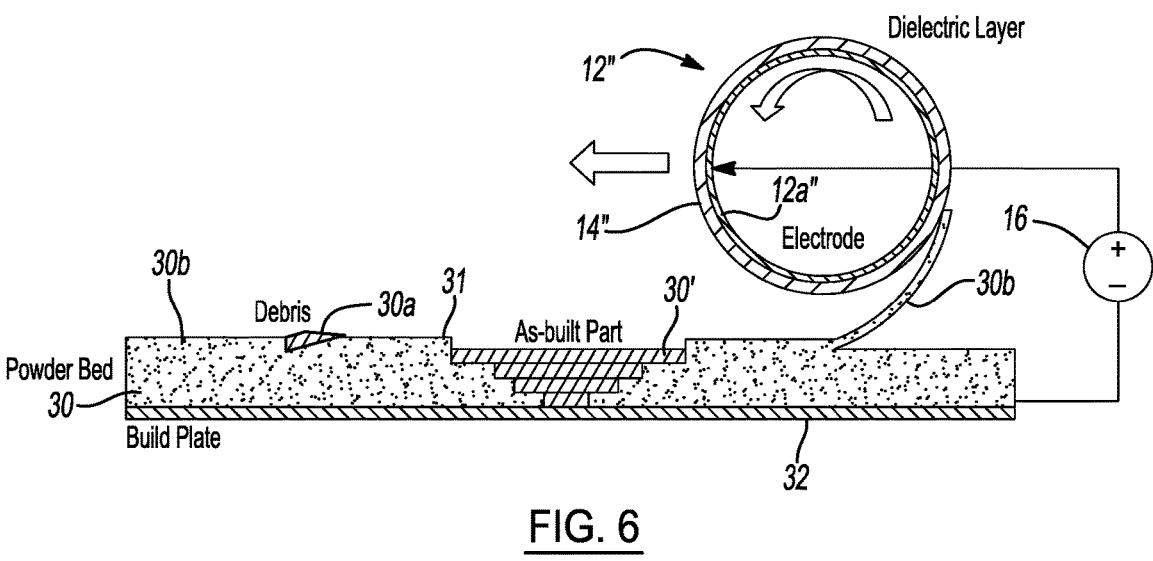
FIG. 6 shows another embodiment of the electrode subsystem of the system of FIG. 1 in which the electrode subsystem forms a round, drum-like component having an circular electrode with a dielectric layer on an outer surface of the electrode, and wherein the electrode subsystem is rotated as it is moved longitudinally along X and/or X axes to pick up a predetermined thickness of an upper surface portion of the powder bed layer, as well as to pick up debris present on the upper surface of the powder layer.

Referring now to FIG. 6, another embodiment of the electrode subsystem 12 is shown in the form of a cylindrical electrode subsystem 12". Again, the cylindrical electrode subsystem 12" may be used with some or all of the components of the system shown in FIG. 1, but since the subsystem 12" is rotated while being moved linearly along one of the X or Y axes, at least one of the motion control subsystem 28 or 28' will be used to create the relative motion between the subsystem 12" and the powder bed 30. The electrode subsystem 12" in this embodiment includes a circumferential electrode 12a" that helps to form a round cylinder, and which has a dielectric layer 14" secured to its exterior surface, for example by a suitable adhesive. In some embodiments the circumferential electrode 12a" has a thickness of between about 2 mm-5 mm, while the dielectric layer 14" has a thickness between about 1 mm-5 mm.

The motion control subsystem 28 in used to impart rotational motion to the electrode subsystem 12", while also simultaneously moving the subsystem 12" linearly over the powder bed 30, and generally parallel to the upper surface 31 of the powder bed, while maintaining the gap 34 distance. Accordingly, separate DC stepper motors and/or a combination of DC stepper motors and one or more linear actuators may be used for the motion control subsystem 12 to enable this embodiment.

As rotation of the cylindrical electrode subsystem 12" occurs and the different portions of the dielectric layer 14" come into facing relationship with the upper surface 31 of the powder bed 30, a thin layer of powder 30b is lifted off of the powder bed and becomes attached to the dielectric layer 14". Accordingly, with the electrode subsystem 12" of FIG. 6, the outer circumference of the dielectric layer 14" needs to be at least about equal to, or slightly larger than, the length of the powder bed 30 that the electrode subsystem 12" needs to traverse.

Figure 7:
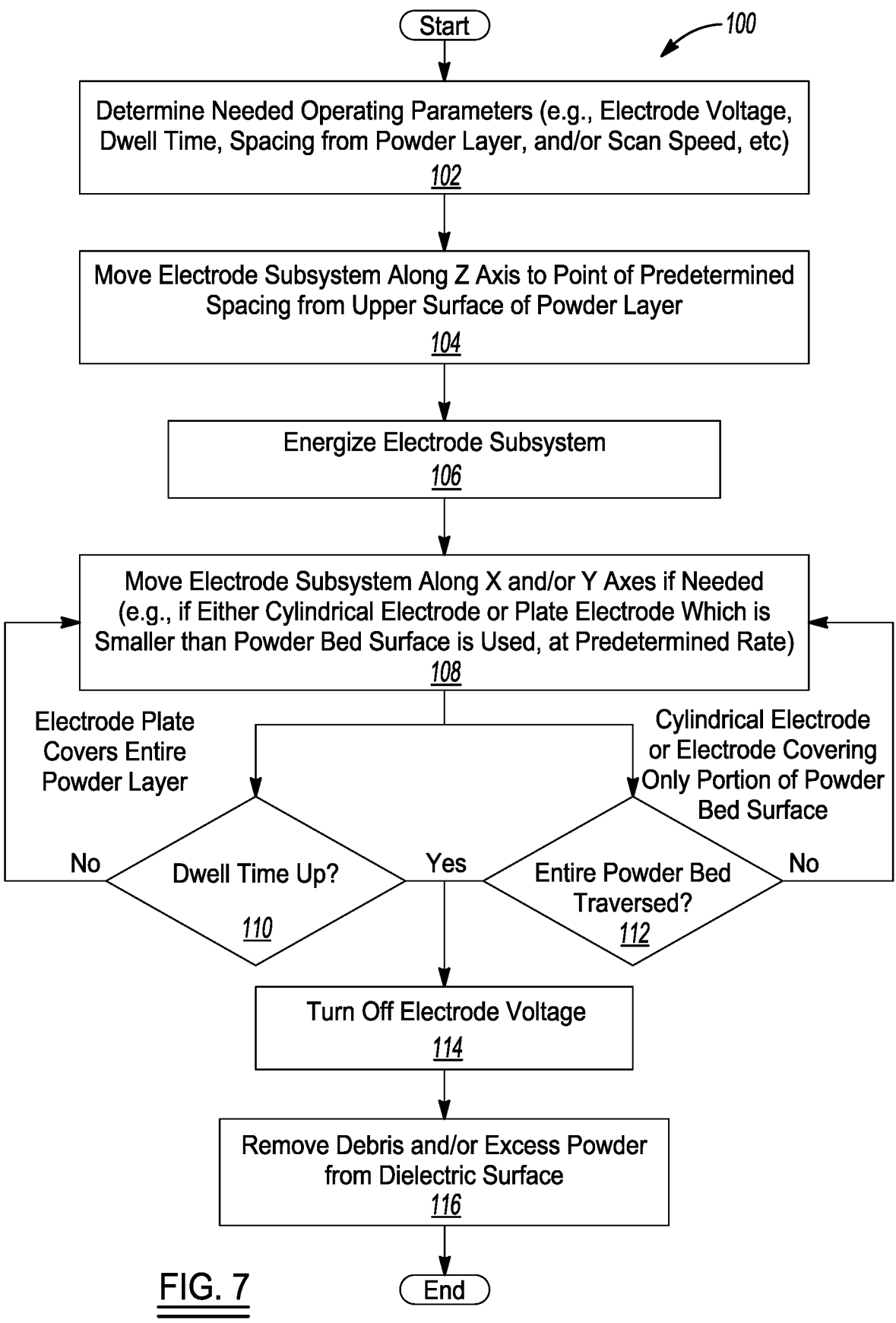
FIG. 7 shows a high level flowchart of various operations that may be performed by the system of FIG. 1, when using any of the embodiments of the electrode subsystem.

Referring now to FIG. 7, a high level flowchart 100 is shown illustrating various operations that may be performed by the various embodiments of the system 10 of FIG. 1. Initially at operation 102 a determination is made as to the needed operating parameters (e.g., electrode voltage to develop the needed electric field strength at the gap 34, dwell time for the electric field, required spacing from the powder layer 30, and scan speed if a moving electrode subsystem 12' or 12" is being used). At operation 104 the electrode subsystem 12 (or 12' or 12") is moved along the Z axis to the point of desired spacing from the upper surface 31 of the powder layer 30. At operation 106 the electrode subsystem is then energized to develop the required electric field. At operation 108, if one of the movable electrode subsystems 12' or 12" is being used, then the electrode subsystem is moved along one or both of the X or Y axes at a predetermined scan speed. If the stationary electrode subsystem 12 is being used, then a check is made to start monitoring the dwell time at operation 110. When the predetermined dwell time is reached, the voltage to the electrode subsystem 12 is turned off. Debris and powder may then be removed from the dielectric layer 14 using a brush or any suitable tool, or possibly even by reversing the polarity of the voltage applied to the ground plate 32 and the electrode 12a.

If a movable electrode subsystem such as subsystem 12' or 12" is being used, then a check is initially made at operation 112 if the entire powder bed 30 has been traversed. If this check produces a "NO" answer, then operation 108 is repeated. When the check at operation 112 indicates that the entire powder bed 30 has been traversed, then voltage to the electrode subsystem 12' or 12" is turned off, and debris and powder may then be removed from the dielectric layer 14' or 14", as indicated at operation 116.

Figure 8:
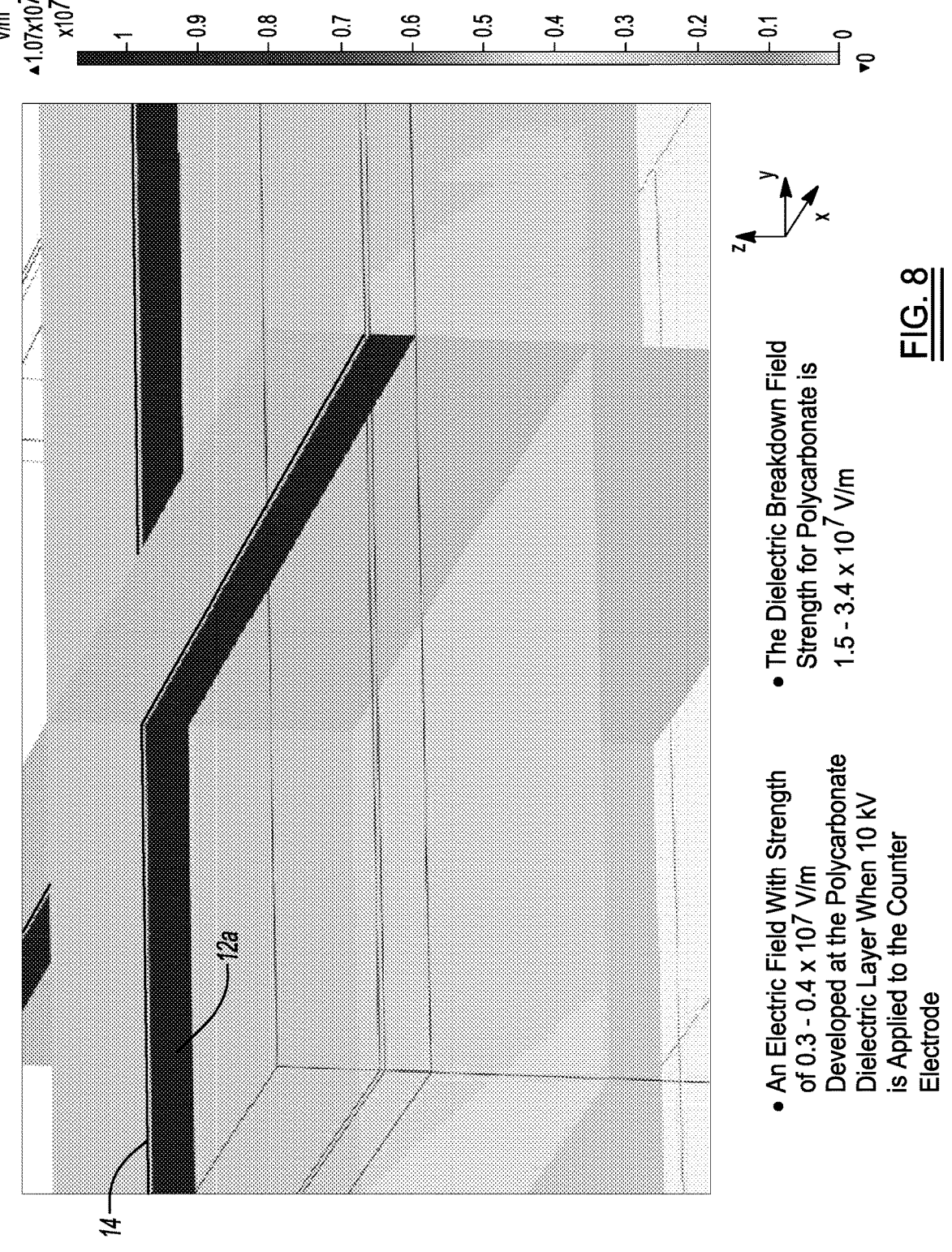
FIG. 8 is a high level diagram illustrating a test which created an electric field strength of $0.3\text{-}0.4\times10^7$ V/m at a polycarbonate dielectric layer of the electrode subsystem of FIG. 1, and where the dielectric breakdown occurred with an applied electric field strength of $1.5\text{-}3.4\times10^7$ V/m.

Referring to FIG. 8, a simulation 150 is shown illustrating an electric field strength of $0.3-0.4\times10^7$ V/m that was developed at the dielectric layer 14 (in this example a polycarbonate layer) when a 10 kV signal is applied at the electrode 12a. The dielectric field breakdown strength for polycarbonate is $1.5-3.4\times10^7$ V/m.

Figures 9A, 9B, 9C:
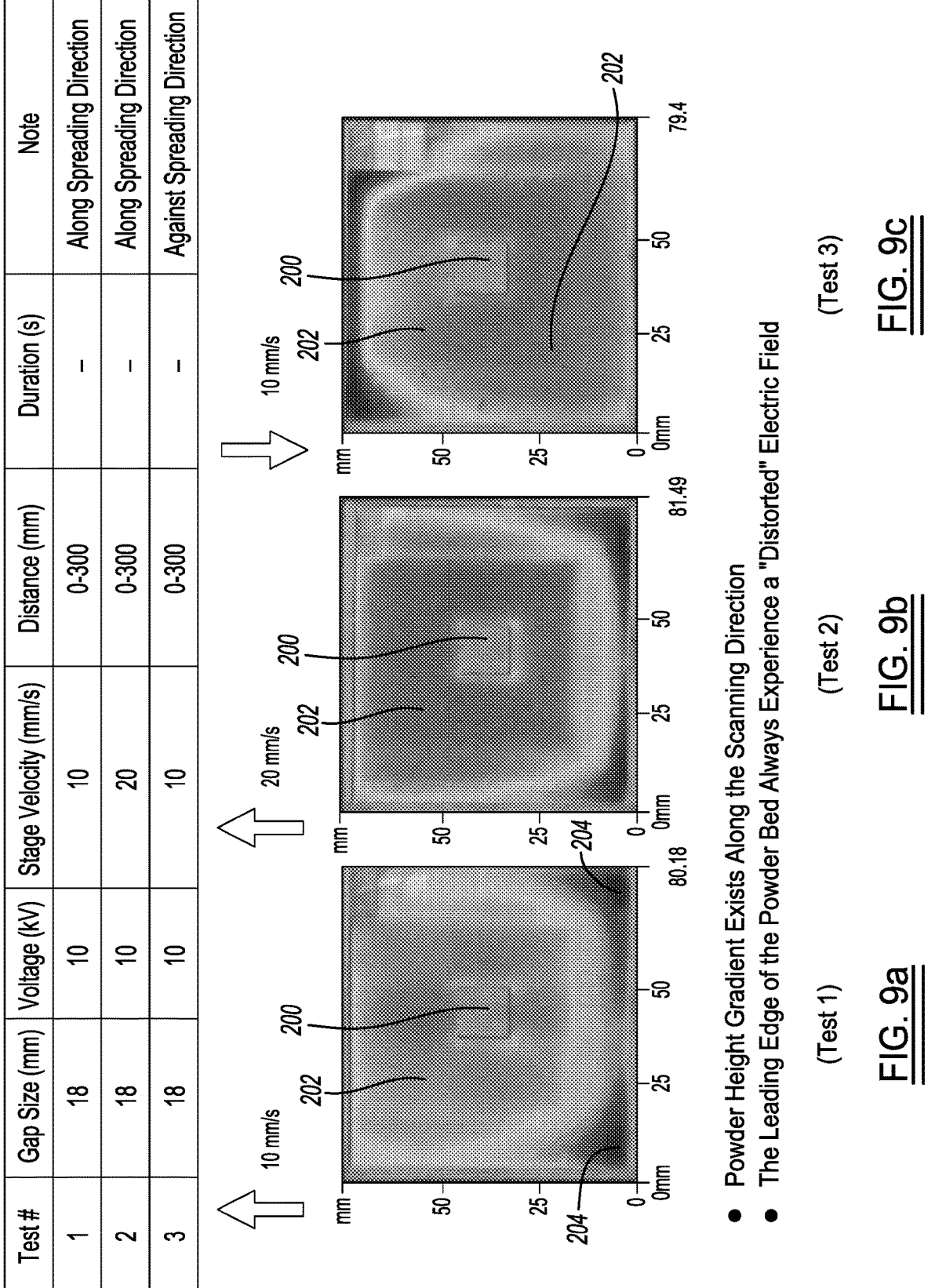
FIGS. 9a-9c show test results using a copper build plate with a powder bed and a solid center section to illustrate the amount of powder lifted using an electric field developed with a 10 kV signal, and where "Test 1", "Test 2" and "Test 3" show the test conditions (different in the lifter moving speed and direction) that produced the powder lift simulations of FIGS. 9a-9c, respectively, and which also show the excessive powder removal due to the constant supply of fresh/empty dielectric surface and undistorted electric field at the leading edge of the powder bed during the beginning of movement of the electrode subsystem.

Referring to FIGS. 9a-9c, test results to show powder lifting are presented to show good general uniformity of powder lifting at areas 202 around a solid center section 200, at different scan speeds used for a moving electrode subsystem (e.g., electrode subsystem 12'). These test results were produced using a powder layer applied to a copper build plate. FIGS. 9a-9c illustrate a lesser degree of powder lift at areas 202, owing to the saturation of the dielectric layer and a small degree of "edge effect" as the electrode subsystem is initially scanned over the build plate.

Figures 10A, 10B, 10C:
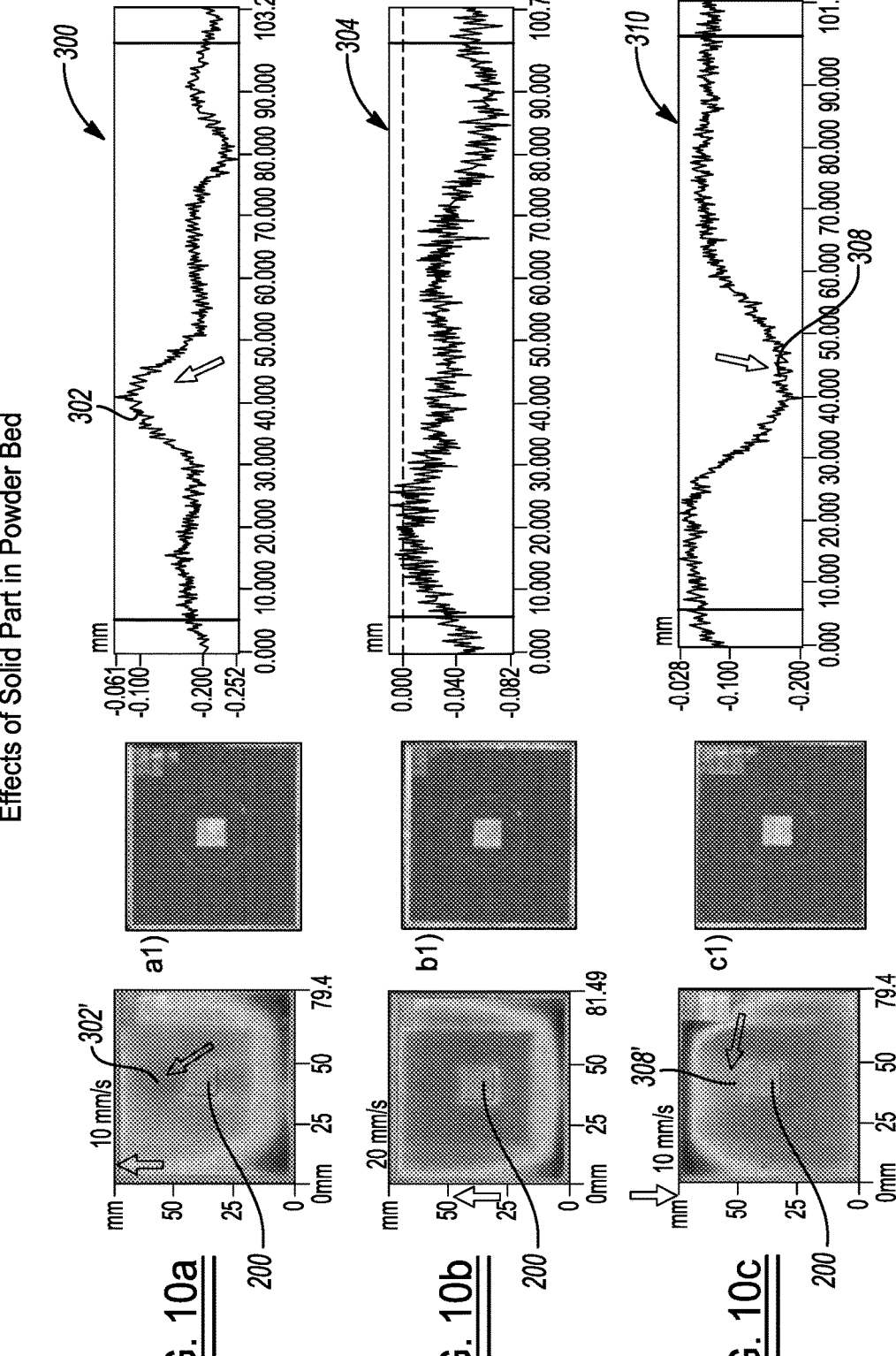

Referring briefly to FIGS. 10a-10c, the same scans are shown as in FIGS. 9a-9c, along with additional FIGS. 10a1, 10b1 and 10c1, and graphs 10a2, 10b2 and 10c2. Graphs 10a2-10c2 show the effects of a solid (i.e., fused) part in a portion of the powder bed. The system 10 can lift a powder layer of about 150 μm in thickness, however, the presence of a solid part slightly distorts the electric field, which reduces the ability to lift a powder layer at point 302' in FIG. 10a, after passing over the solid parts indicated by portion 302 of graph curve 300 in FIG. 10a2. Curve 300 is showing the thickness of the remained powder layer being during the scan of FIG. 10a. Curve 304 illustrates that a faster scanning speed can potentially reduce the impacts from a distorted electric field due to the presence of an embedded part. Curve 310 shows the amount of powder lift at point 308' in FIG. 10c, which is in a scan direction just prior to encountering the solid part 200. Portion 308 of curve 310 indicates that the thickness of the powder lifted is greatest at this point.

Referring to FIG. 11, additional simulations are presented to show the amount of powder lifting which occurs when a stationary electrode subsystem, such as electrode subsystem 12, is used. Note that the tests were conducted using a stationary powder remover similar to the design shown in FIGS. 2 and 3, of which the top electrode is larger than the area of the powder bed. The consistent powder removal in all tests with various durations and gap sizes implies that the electrode subsystem was saturated in every single test.

The present disclosure thus provides a plurality of embodiments of systems which are able to remove a thin layer of powder, as well as debris, from an upper surface of a powder bed being used in an PBFAM operation. The system and method of the present disclosure thus is able to re-level the upper surface of the powder bed, as well to remove small debris, which could otherwise negatively affect the build quality of a part being made in a layer-by-layer PBFAM process. The system in its various embodiments can be deployed without significantly modifying the PBFAM process, and without significantly slowing down the manufacture of a part being made using a PBFAM process.

It should also be appreciated that while the present disclosure has been described in connection with a PBFAM process, the disclosure is not limited to use with only a PBFAM process. For example, and without limitation, the present disclosure may readily be implemented in connection with virtually any powder bed additive manufacturing systems including binder jet printing, which is not a fusion technique.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," ad "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "Inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for removing an upper layer of powder from a powder bed in an additive manufacturing process, wherein the powder bed includes metal powder particles, and the additive manufacturing process is being used to build a part, the system comprising:

a controller;

an electrode subsystem having an electrode and a dielectric layer secured to the electrode;

a metallic build plate for supporting the powder bed thereon;

the electrode subsystem being supported above the powder bed such that the dielectric layer is separated from an upper surface of the powder bed by a gap of a predetermined distance;

a motion control subsystem responsive to the controller and configured to control a spacing between a lower surface of the electrode subsystem and the powder bed, such that the spacing is maintained at a predetermined distance as successive layers of the part are formed;

a power source coupled to the electrode subsystem and the build plate for supplying a voltage across the electrode subsystem and the build plate, the voltage generating an electric field in the gap which is sufficient to attract and lift a predetermined thickness portion of the powder bed adjacent the upper layer, onto the dielectric layer, across an entire area defined by the electrode subsystem, below the electrode subsystem, at one time, to leave a new upper surface on the powder bed; and wherein the electrode subsystem comprises a planar configuration arranged parallel to the upper surface of the powder bed, and having dimensions sufficient to cover a major portion of the build plate.

2. The system of claim 1, wherein the power source comprises a DC voltage source.

3. The system of claim 1, wherein the electrode subsystem has an area sufficient to cover the powder bed, and is stationary while the electric field is being generated.

4. The system of claim 1, wherein the electrode subsystem comprises a planar configuration having an area less than an area of the upper surface of the powder bed.

5. The system of claim 4, further comprising a movement subsystem for moving the electrode subsystem over the upper surface of the powder bed, parallel to the upper surface of the powder bed, while maintaining the gap, and while the electric field is being generated.

6. The system of claim 1, further comprising:

a movement subsystem;

wherein the electrode of the electrode subsystem comprises a cylindrical electrode subsystem, wherein the electrode comprises a cylindrical electrode, and the dielectric layer comprises a dielectric layer conforming to a shape of the cylindrical electrode; and the movement subsystem configured to move the cylindrical electrode subsystem rotationally above and over the surface of the powder bed while maintaining the gap.

7. The system of claim 1, wherein the electrode comprises a thickness of no more than 5 mm.

8. The system of claim 1, wherein the dielectric layer comprises a thickness of no more than about 3 mm.

9. The system of claim 1, wherein the electrode is comprised of an electrically conductive material including at least one of: gold; silver; copper, steel; stainless steel; aluminum; and iron.

10. The system of claim 1, wherein the dielectric layer is comprised of at least one of polypropylene or polycarbonate.

11. The system of claim 1, wherein the electric field comprises a strength of between about $0.3 \times 10^7$ V/m to about $0.4 \times 10^7$ V/m.

12. The system of claim 1, where the powder bed forms a powder bed in a laser powder bed fusion (LPBF) additive manufacturing (AM) operation.

13. A system for removing an upper layer of powder from a powder bed, where the powder bed is being used in a laser powder bed fusion (LPBF) additive manufacturing (AM) operation to form a part in a layer-by-layer operation, the system comprising:

a controller;

an electrode subsystem having a planar electrode and a planar dielectric layer secured to the planar electrode;

an electrically conductive build plate for supporting the powder bed thereon;

the electrode subsystem being supported above the powder bed such that the dielectric layer is separated from an upper surface of the powder bed by a gap of a predetermined, uniform distance;

a motion control subsystem responsive to the controller and configured to control a spacing between a lower surface of the electrode subsystem and the powder bed, such that the spacing is maintained at a predetermined distance as successive layers of the part are formed;

a DC power source coupled to the electrode subsystem and the build plate for supplying a DC voltage across the electrode subsystem and the build plate, the voltage generating an electric field in the gap which is sufficient to attract and lift a predetermined thickness portion of the powder bed adjacent the upper surface, onto the dielectric layer, over a full area underneath the electrode subsystem, defined by the electrode subsystem, at one time, to leave a new upper surface on the powder bed; and wherein the electrode subsystem comprises a planar configuration arranged parallel to the upper surface of the powder bed, and having dimensions sufficient to cover a major portion of the build plate.

14. The system of claim 13, wherein the electrode subsystem is held stationary while the electric field is being generated.

15. The system of claim 13, further comprising:

a movement subsystem for moving the electrode subsystem;

wherein the electrode subsystem has an area which is less than an entire area of the upper surface of the powder bed; and wherein the movement subsystem is configured to move the electrode subsystem over the upper surface, parallel to the upper surface, while the electric field is being generated, such that the electrode subsystem traverses the entire area of the upper surface of the powder bed.

16. The system of claim 13, wherein the dielectric layer comprises a thickness of no more than about 5 mm.

17. The system of claim 13, wherein the electrode comprises at least one of gold; silver; copper, steel; stainless steel; aluminum; or iron.

18. The system of claim 13, wherein the dielectric layer comprises at least one of polypropylene or polycarbonate.

19. A method for removing an upper surface layer of powder from a powder bed, wherein the powder bed includes metal powder particles used to form a part in a layer-by-layer, additive manufacturing operation, the method comprising:

providing a controller;

using a metallic build plate to support the powder bed thereon;

arranging an electrode subsystem having an electrode and a dielectric layer secured to the electrode above an upper surface of the powder bed, wherein the electrode subsystem is separated from the upper surface layer of the powder bed by a gap having a predetermined distance;

using a motion control subsystem responsive to the controller and configured to control a spacing between a lower surface of the electrode subsystem and the powder bed, such that the spacing is maintained at a predetermined distance as successive layers of the part are formed;

applying an electrical signal across the electrode subsystem and the metallic build plate to generate an electric field in the gap below the electrode subsystem, defined by an area of the electrode subsystem;

using the electric field to lift a portion of the powder bed adjacent the upper surface layer of the powder bed, onto the dielectric layer, to create a new surface layer for the powder bed; and wherein the electrode subsystem comprises a planar configuration arranged parallel to the upper surface of the powder bed, and having dimensions sufficient to cover a major portion of the build plate.

20. The method of claim 19, further comprising moving the electrode subsystem over the upper surface layer of the powder bed, while maintaining the gap, and while the electric field is being generated.

* * * * *